United States Patent
King, Jr.

[11] 3,753,219
[45] Aug. 14, 1973

[54] TRANSDUCER MOUNTING ASSEMBLY
[76] Inventor: John L. King, Jr., P.O. Box 64, Sausalito, Calif. 94965
[22] Filed: Sept. 30, 1971
[21] Appl. No.: 184,997

[52] U.S. Cl. ............................... 340/5 R, 340/8.5
[51] Int. Cl. .................................... H04b 11/00
[58] Field of Search .............. 340/3 PS, 5 R, 8 D, 340/8 S; 181/0.5 A, 0.5 VM; 114/0.5 R

[56] References Cited
UNITED STATES PATENTS
3,039,078  6/1962  Wilcoxon ........................ 340/5 R
2,527,217  10/1950  Hayes .............................. 340/8 D Primary Examiner—Richard A. Farley
Attorney—Stephen S. Townsend, Donald J. De Geller et al.

[57] ABSTRACT

A through-hull fitting having a spherical socket into which an electrical transducer mounted within a ball can be adjusted to position the transducer in a vertically aligned axis.

3 Claims, 4 Drawing Figures

Patented Aug. 14, 1973
3,753,219
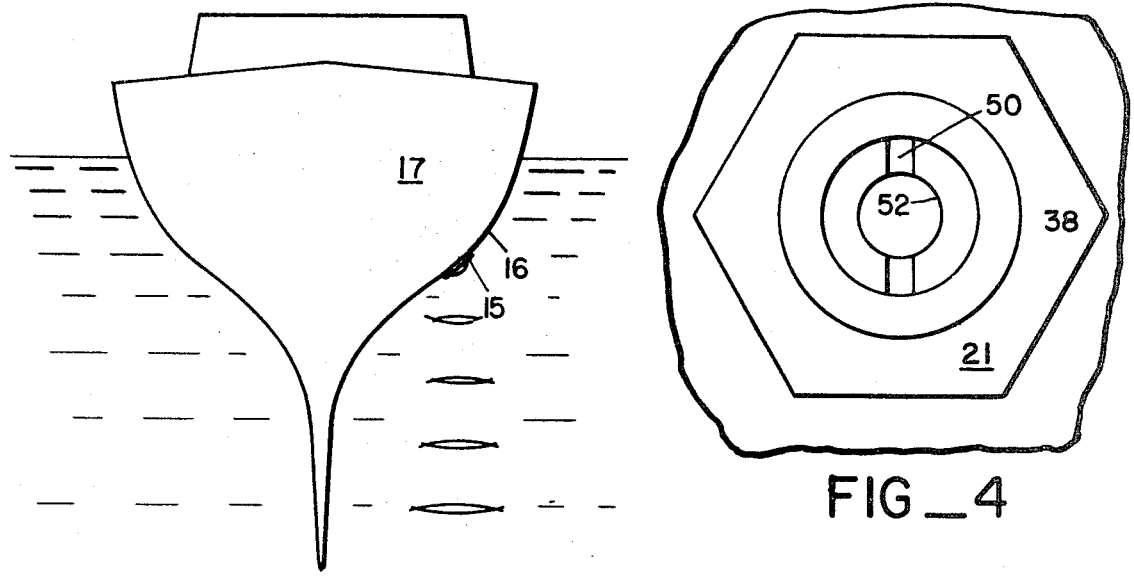
FIG_4
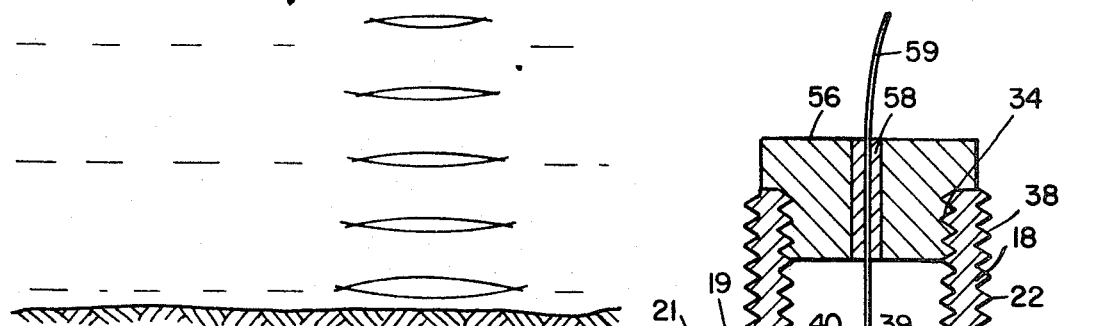
FIG_1
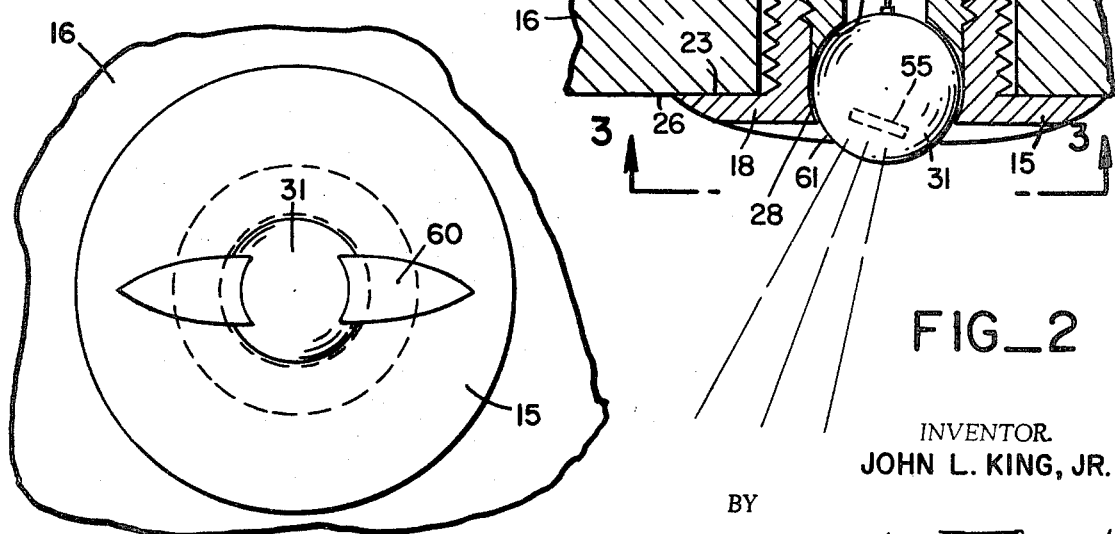
FIG_2
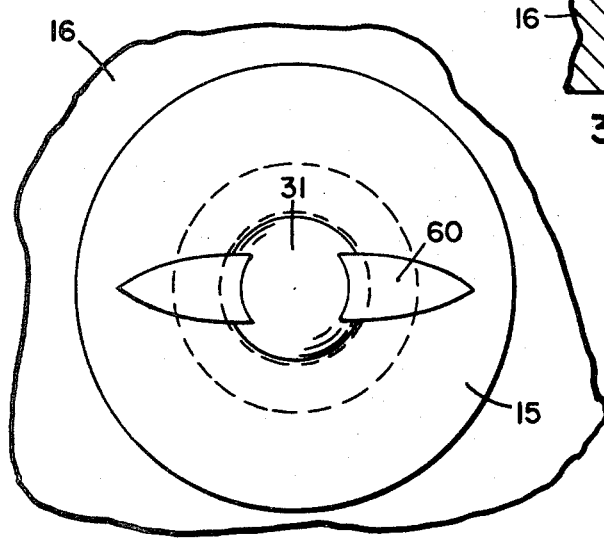
FIG_3
INVENTOR.
JOHN L. KING, JR.
BY
*Townsend and Townsend*
ATTORNEYS

TRANSDUCER MOUNTING ASSEMBLY

Certain electrical apparatuses used for navigation and as environmental sensing aids require a transducer to be mounted on a vessel in direct water contact and positioned so that the axis of the transducer is in vertical alignment when the boat or vessel is in a normal position. A typical such device is the conventional depth finder in which a piezoelectric crystal or other device is mounted in a through-hull fitting and the fitting is aligned so that the face of the crystal is disposed in vertical alignment. Usually, the contour of the vessel is such that the transducer through the hull mounting is at an angle other than normal. This is usually accomplished by forming V blocks which are interposed between the transducer and the hull in order to align the transducer in its proper alignment. Other such devices sometimes require such alignment, as for example, speed indicators and other electronic sensors.

In the present invention a through-hull fitting is arranged in which a ball is seated in a socket within the fitting in such a way that the ball can be freely rotated to an aligned position and thence the fitting is arranged to wedge the ball into a locked aligned position. The ball is arranged to carry the electronic transducer in such a manner that the transducer can be aligned to proper alignment simply by rotating the ball to the transducer aligned position and thereafter locking the transducer in place.

This invention overcomes the mounting obstacles normally encountered in conventional through-hull mountings in which various means are required to mount the entire through-hull fitting in a proper aligned relationship to cause the transducer to be in an adequate alignment to create satisfactory operation.

A further object of this invention resides in structure which will allow the top or inside portion of the interior of the fittng to be removed while the boat is in the water so that the existing ball carrying the transducer can be removed and repaired and thence replaced with either a new ball or the repaired old ball.

This feature and advantage of this invention allows the easy removal and replacement of the transducer ball from the interior of the vessel without the necessity of removing the vessel from the water as is usually required in existing transducer mounting assemblies.

Another feature and advantage of the invention lies in the fact that the vessel can be fitted with transducer mounting assemblies without the transducer so that at some future time while the boat is in the water a transducer may be installed. The fact that the transducer mounting employs a ball allows different types of transducers having different electrical requirements to be interchangeably mounted, the only requirement being that the transducers themselves be encapsulated within a ball sized for the fitting and that they be aligned by rotation for adequate electronic alignment of the transducer when mounted.

Another feature and advantage of this invention lies in the fact that the fitting lies in a mounting which is substantially flush with the hull of the vessel thus allowing the transducer to be mounted with a minimum of water resistance. In previous mountings transducer plugs and other apparatus were used to position the transducer in its proper axis which involved a great amount of water resistance. The feature of eliminating water resistance is highly desirable where optimum hull speeds are required such as in power racing, sailing vessels and the like.

These and other features will become apparent in the following specification and accompanying drawings in which:

FIG. 1 is an overall view of the vessel showing the transducer mounted at an angle with respect to normal on the side of the side wall of the botom of the hull;

FIG. 2 is a cross sectional view of the fitting;

FIG. 3 is a plan view of the outside of the transducer; and

FIG. 4 is a top plan view of the inside of the transducer.

The transducer assembly 15 is arranged to be mounted on the bottom portion of the hull 116 of a vessel 17. The fitting 15 includes a cylinder 18 having a flanged outer end 18 in which the cylinder is arranged to penetrate a hole 19 in the side wall 16 of the vessel 17. Obviously in this case the hole is drilled with a slightly oversized hole 19, preferably while the boat is out of the water. The outer wall of cylinder 18 is formed or threaded so that a mounting nut 21 can be screwed onto threads 22 to wedge the inside wall 23 of flange 18 in water-tight engagement with the outer surface 26 of hull wall 16.

As is usually the case in conventional practice a bedding compound should be between the surface 23 and the hull surface 26 to insure a totally water-tight fitting. The bottom interior of cylinder 18 is formed with a semi-spherical or radiused mouth portion 28 into which a transducer carrying ball 31 is fitted. The interior wall of cylinder 18 is formed with an inside diameter which is just slightly larger than the diameter of ball 31 so that the ball can pass from the top portion 34 of the cylinder down to the throat or seat 28. The ball thereby nests into the throat area. The interior of cylinder 18 is threaded at 34 to allow the fitting of a plug 39 which is similarly threaded at 40 to engage the threads 34. The bottom portion of plug 39 is formed in a semi-spherical or radiused configuration on end 42 having a radius sized the same as ball 31. The top portion of plug 39 is formed with a screwdriver receiving groove or slot 50 to enable a screwdriver to tighten plug 39 against ball 31. The interaction of the pressure of plug 39 against ball 31 and the engagement of the ball 31 with the throat 28 of cylinder 18 forms a water-tight seal to the interior of the fitting. The central portion of plug 39 is hollowed to form an interior cylinder wall 52 through which wires or leads to a tranducer 55 encapsulated within ball 31 can extend outwardly to the interior of the hull of the vessel and through the bore of cylinder 18. A further sealing cap 56 may be threadedly mounted to the top portion 34 of cylinder 18 to form a further water-tight seal. A water-tight gasket seal 58 can be arranged through which the electrical wiring 59 leading to transducer 55 can in a water-tight fashion form the electrical communicatin from the interior of the vessel to the transducer 55.

Mounted on the outer portion of flange 18 is a ridge 60 which is formed on an inside edge 61 with a diameter equalling ball 31 for further engagement of the ball and to provide a means to prevent the flange 18 from rotating until the mounting nut 21 is tightened.

In typical installation a hole 19 is drilled through the side wall of the vessel at the location where the transducer fitting is intended to be mounted. The cylindrical assembly 18 is then fitted from the outside of the hull with the cylinder 18 projecting inwardly of the interior of the vessel so that the inside wall of flange 18 is tightly nested against the outer wall 26 of the vessel. Preferably a bedding compound is interposed between the flange and the vessel wall 26 to provide a more perfect water seal. Nut 21 is installed and tightened while an appropriate tool is engaged with flange or protrusion 60. In proper practice the flange 60 should be orientated so that its longitudinal axis runs fore and aft of the vessel to provide a minimum of water impedance and a maximum of protection from debris to ball 31. Thereafter the selected ball 31 carrying a transducer such as the piezoelectric sensing and receiving crystal for a depth finder is inserted through top section 38 and nested in throat 28. The ball is then rotated so that the transducer has its active face in a vertical orientation when the vessel is in normal operating condition. That is, normally when the boat is at rest the broad face of the transducer should be facing straight down, or in whatever other electrical orientation is best suited for the particular electrical apparatus employed. While ball 31 is held in this position, plug 39 is screwed into place so that its semi-spherical or radiused surface 42 tightly engages the top surface 42 of ball 31 to lock the ball in water-tight locked aligned engagement. The lead 59 is then passed through the cap gasket 58 and cap 56 is then screwed into place. In this orientation the transducer is completely installed and ready for connection with the depth finder or other electrical apparatus for which it is intended.

Should it be desired to remove the ball for either its repair or replacement, the reverse procedure is employed, that is, plug 56 is unscrewed and removed and plug 39 is removed thus allowing ball 31 to simply be removed from its socket. If this is down with the boat in the water, a water-tight cap 56 can be screwed on until it is time to replace the ball.

Upon replacing the ball while the boat is in the water, the new cap 56 is removed, ball 31 is again inserted in the socket, aligned in rotational alignment for optimal electronic alignment with transducer 55 and the plug 39 is screwed into place to again form a water-tight alignment locked seal. Final assembly is completed by leading the lead wire into gasket 58 of plug 56 and screwing the plug 56 into place.

It can be seen that in this apparatus the transducer mounted device is adaptable to receive a great variety of electrical transducers which can be freely interchanged while the boat is in the water either for exchange of equipment or for repair. Furthermore the clean lines and flush hull mounting of the device provides a minimal of water resistance.

I claim:

1. A nautical transducer mounting device for through-hull mounting in the side walls of a hull of a vessel below water line comprising a cylinder having an outwardly extending flange at one end in which the flange is adapted to rest against outer wall of the hull and the cylinder is arranged to penetrate through the hull into the interior of the vessel, mounting means on the outer face of said cylinder locking said flange tightly against the wall of the hull of said vessel, said cylinder having an interior cavity terminating with a partial spherical edge, a ball having a diameter smaller than the side wall of the interior of said cylinder and substantially the same diameter as said spherical edge, a plug threadedly mounted on the interior wall of said cylinder having a spherical lower surface having substantially the same diameter as said ball engaging the upper surface of said ball, said ball containing an electrical apparatus, said plug being movable in a first position to allow said ball to be rotated to register the electrical apparatus in a predetermined registration and being movable to a second position in compression against said ball to lock said ball in said fixed predetermined registration.

2. An apparatus according to claim 1 and wherein the external surface of said flange is formed with a raised protuberance having an underface which is coextensive with said partial spherical edge.

3. A nautical transducer mounting device for through-hull mounting in the side walls of a hull of a vessel below water line comprising fitting means mounted through the side wall of said hull, a bore mounted in said fitting means, a spherical socket mounted within said bore, a ball mounted within said spherical socket and lock means operative with said spherical socket movable from a first position to allow said ball to rotate freely and to a second position to lock said ball in fixed alignment and an electrical transducer mounted rigidly within said ball, said transducer being of the type requiring a fixed registration relative to the body of water whereby said ball can be rotated when said lock means is in said first position to orientate said transducer to its predetermined alignment with respect to the water and thereafter said lock means is movable to the second position to lock said ball in said fixed alignment whereby said transducer is maintained in its predetermined water alignment.

* * * * *